United States Patent [19]

Weibling

[11] 4,049,059

[45] Sept. 20, 1977

[54] COMBINED GARDEN CULTIVATOR AND LAWN EDGER

[76] Inventor: Robert L. Weibling, 5041 E. Lake Road, Sheffield Lake, Ohio 44054

[21] Appl. No.: 696,841

[22] Filed: June 17, 1976

Related U.S. Application Data

[63] Continuation-in-part of Ser. No. 616,877, Sept. 25, 1975, abandoned.

[51] Int. Cl.² .......................... A01B 1/00; A01G 3/06
[52] U.S. Cl. ...................................... 172/15; 172/43; 30/276
[58] Field of Search ...................... 172/13, 15, 16, 17, 172/41, 42, 43, 111; 56/256, 239, 172, 255; 30/276, DIG. 5; 308/33, 31

[56] References Cited

U.S. PATENT DOCUMENTS

| | | | |
|---|---|---|---|
| 2,491,892 | 12/1949 | Claus | 172/42 |
| 2,805,611 | 9/1957 | Fletchall | 172/41 |
| 2,823,597 | 2/1958 | Kelsey | 172/41 |
| 2,991,838 | 7/1961 | Lane | 172/111 |
| 3,031,018 | 4/1962 | Smithers | 172/41 |
| 3,136,372 | 6/1964 | Roach | 172/41 |
| 3,175,636 | 3/1965 | Winkelmann | 308/33 X |
| 3,218,789 | 11/1965 | Ott | 30/276 |
| 3,530,653 | 9/1970 | Ott | 56/256 X |

*Primary Examiner*—Richard J. Johnson
*Attorney, Agent, or Firm*—Clarence A. O'Brien; Harvey B. Jacobson

[57] ABSTRACT

An elongated inclined support arm is provided and a horizontal transverse shaft member is journaled from the lower end of the support arm and supports a rotary blade assembly thereon spaced to one side of the support arm. An electric motor is supported from the upper end of the support arm and includes an output shaft paralleling the support arm and extending downwardly along the latter toward the lower end thereof from which a right angle gear transmission is supported having an input shaft projecting toward the upper end of the support arm and an output shaft of which the rotary shaft member comprises a part. A drive shaft extends along the support arm and drivingly connects the motor output shaft to the transmission input shaft and an intermediate portion of the drive shaft is journaled from a corresponding intermediate portion of the support arm. An arcuate shield panel is supported from the transmission output shaft and the lower end of the support arm in position partially embracingly encircling the rotary blade assembly and opening toward the latter away from the upper end of the support arm. The shield panel is supported for oscillation about the axis of rotation of the transmission output shaft and one arch end of the shield includes a ground engaging support portion, structure being connected between the shield panel and the support arm for releasably retaining the shield panel in adjusted angularly displaced position and yieldingly biasing the shield panel from one limit of oscillation thereof toward the other limit of oscillation thereof.

13 Claims, 5 Drawing Figures

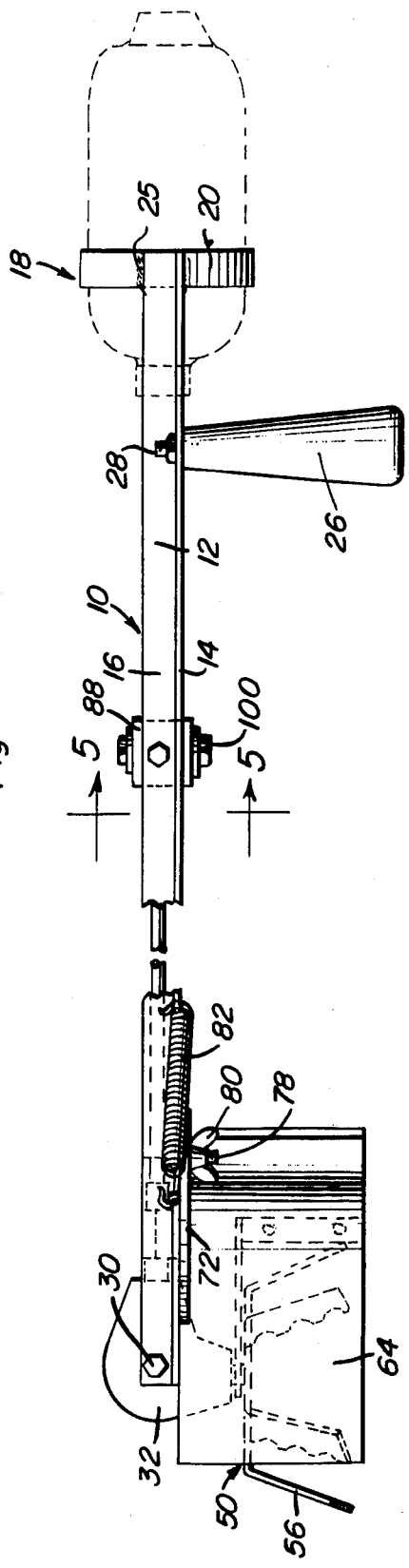
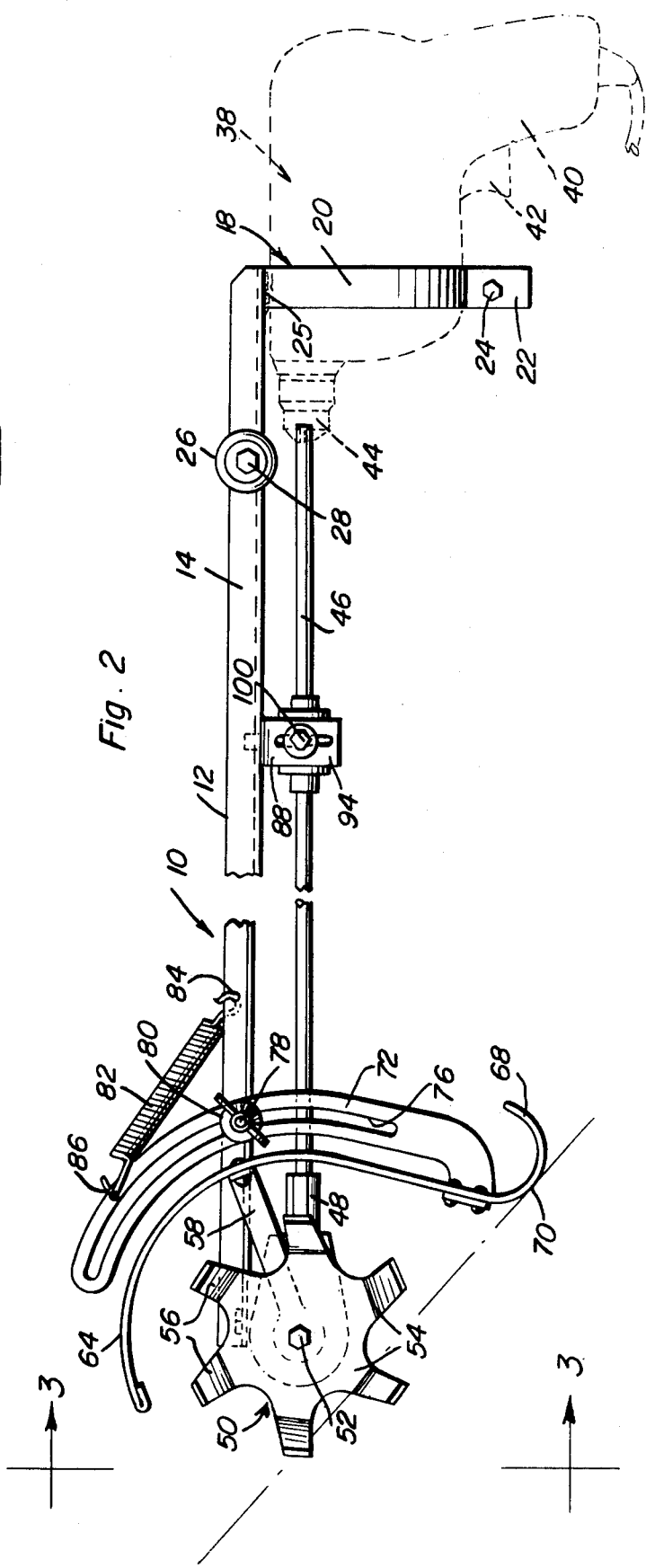

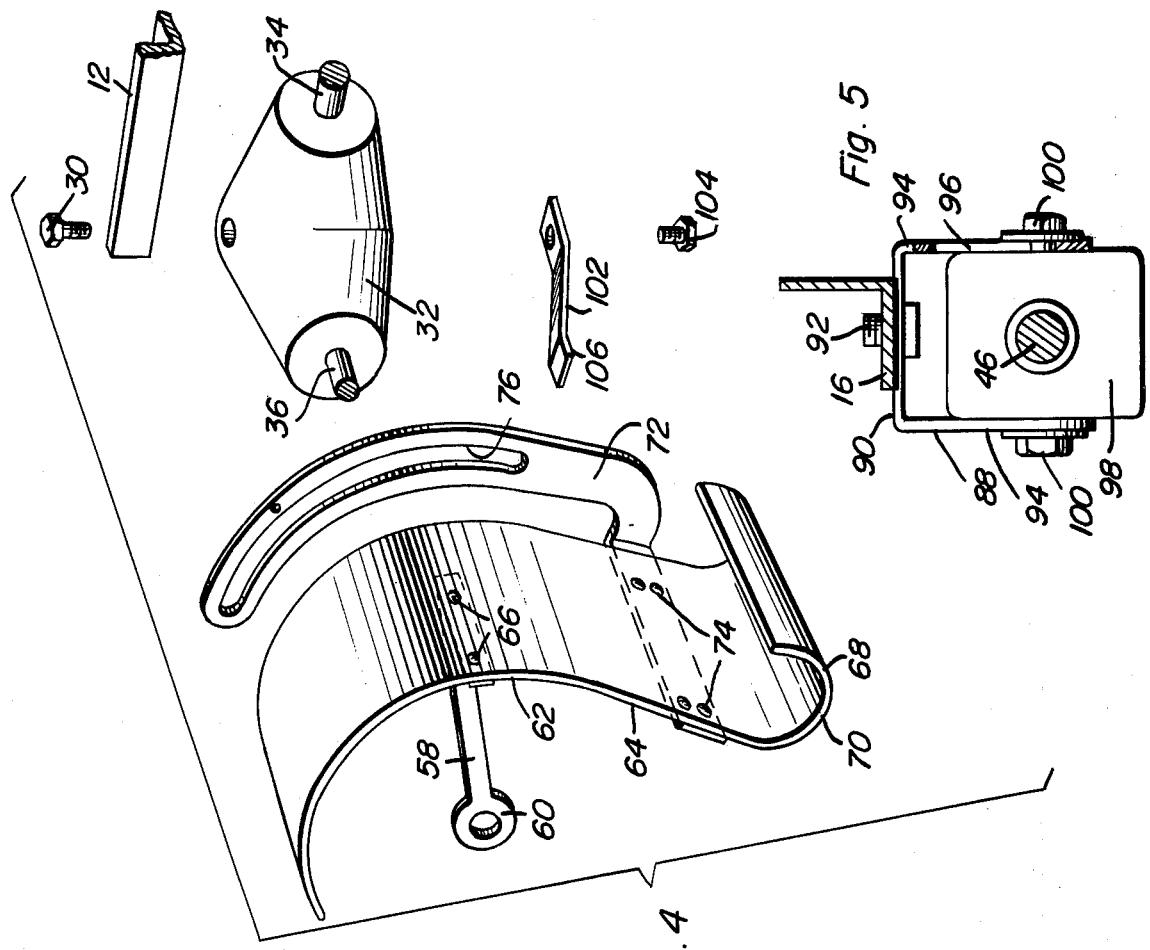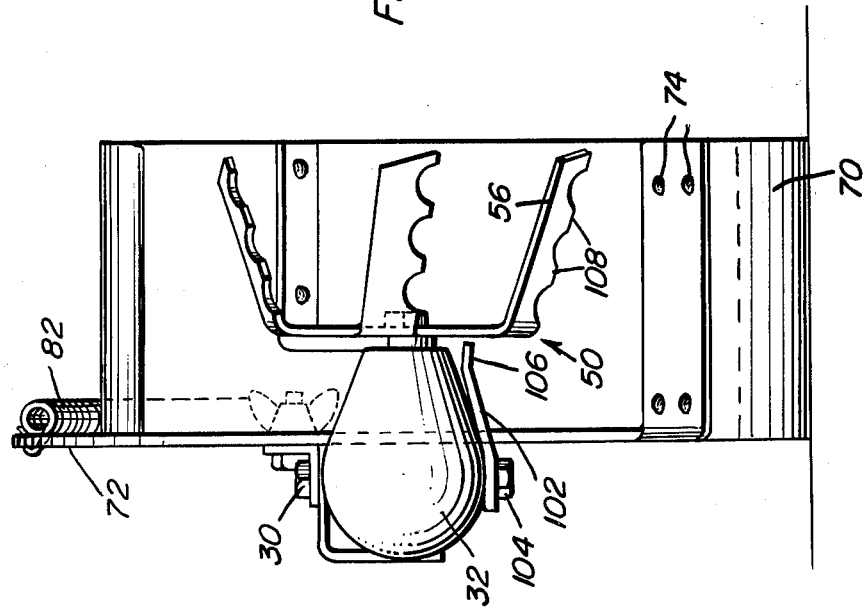

COMBINED GARDEN CULTIVATOR AND LAWN EDGER

BACKGROUND OF THE INVENTION

This application comprises a continuation-in-part of my co-pending U.S. application Ser. No. 616,877, filed Sept. 25, 1975, now abandoned.

Various forms of ground cultivating and lawn edging structures of the motor-driven type have been heretofore designed. Most of these previously known structures have, however, not been designed to perform both functions and those which have been capable of performing both functions require considerable modification in order to be converted from a lawn edger to a ground cultivator. Further, some dual function devices of this type have proven to be ineffective in performing both functions with the same proficiency.

BRIEF DESCRIPTION OF THE INVENTION

The motor driven implement of the instant invention has been primarily designed for use both as a lawn edger and as a light duty cultivator for use in flower beds, around shrubs and in small garden plots. Further, the implement has also been designed in a manner whereby it may be powered by a conventional electric hand drill of the type normally found in private households and the implement may be readily converted from an apparatus particularly well adapted to edge lawns to an apparatus adapted to perform light duty ground cultivating operations.

The main object of this invention is to provide an implement capable of performing lawn edging operations as well as light duty ground cultivating operations.

Another object of this invention is to provide a motor driven implement in accordance with the immediately preceding object and constructed in a manner whereby a conventional hand drill may be utilized as the driving motor for the implement.

Yet another object of this invention is to provide a combined cultivating and edging implement of the motor driven type and constructed in a manner whereby its total weight will be minimal so as to be readily handled and operated by only one hand of the user, if desired.

An ancillary object of this invention is to provide an apparatus in accordance with the immediately preceding object and including a lateral handgrip whereby the implement may be guided by both hands of the user, if desired.

A further important object of this invention is to provide a combined cultivator and lawn edger including ground engaging support means therefor mounted from the edger in a manner such that downward pressure on the edger may slightly lower the rotary blade portion thereof relative to adjacent ground surfaces.

A still further object of this invention is to provide a combined cultivator and lawn edger including a stationarily supported cutter blade closely adjacent the point of connection of the rotary blade of the implement with the power output shaft of the implement in order to assure the cutting of vegetation from the power output shaft in the event vegetation has a tendency to wind thereon.

Yet another object of this invention is to provide a combined cultivating and edging implement including means whereby the depth of cut of the implement during an edging or cultivating operation may be adjusted as desired.

A final object of this invention to be specifically enumerated herein is to provide a combined garden cultivator and lawn edger in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary top plan view of the implement of the instant invention;

FIG. 2 is a fragmentary side elevational view of the assemblage illustrated in FIG. 1;

FIG. 3 is an enlarged front elevational view of the assemblage illustrated in FIG. 1;

FIG. 4 is an exploded perspective view of the lower shield and tiller blade structure of the invention; and FIG. 5 is an enlarged fragmentary sectional view taken substantially upon the plane indicated by the section line 5—5 of FIG. 1.

DETAILED DESCRIPTION OF THE INVENTION

Referring now more specifically to the drawings, the numeral 10 generally designates the combined garden cultivator and lawn edger of the instant invention. The edger 10 includes an elongated support arm 12 consisting of an angle member including right angle flange portions 14 and 16. A motor support structure referred to in general by the reference numeral 18 is carried by one end of the support arm 12 and is in the form of a split clamp assembly comprising an oval band 20 open at one end including outwardly directed parallel apertured flanges 22 interconnected by means of a threaded clamp type fastener 24 secured through the flanges 22. The end of the band 20 remote from the open end thereof is secured, as by welding 25, to the outer side of the adjacent end of the flange 16. Further, the end portion of the flange 14 adjacent the band 20 includes a laterally outwardly projecting handle 26 secured to the flange 14 by means of a fastener 28 secured axially through the handle 26 and transversely through the flange 14.

Mounted on the end of the support arm 12 remote from the motor mounting structure 18 by means of a mounting bolt 30 is a right angle gear transmission 32 including an input shaft portion 34 projecting toward the motor mounting structure 18 along the lengthwise extend of the support arm 12 and an output shaft portion 36 projecting laterally outwardly toward one side of the support arm 12.

The motor mounting structure 18 is operative to clampingly support a hand drill generally referred to by the reference numeral 38 therefrom and the drill 38 may be of conventional design, including the usual pistol grip handle 40, trigger type switch actuator 42 and chuck assembly 44. An elongated shaft 46 has one end thereof chucked in the chuck assembly 44 and the other end thereof drivingly coupled to the input shaft portion 34 by means of a suitable connector 48. Accordingly, actuation of the hand drill 38 to rotate the chuck assembly 44 causes the output shaft 36 of the right angle gear transmission 32 to rotate.

The free end of the output shaft portion 36 has a rotary tiller blade assembly referred to in general by the reference numeral 50 mounted thereon by means of a bolt 52 secured centrally through the blade assembly and into the free axial end of the output shaft portion 36. The blade assembly 50 includes six generally radially outwardly projecting and circumferentially spaced blade members 54 provided with angulated outer end portions 56 which are directed outwardly from the side of the blade assembly 50 remote from the gear transmission 32. The end portions 56 are inclined approximately 15° to 20° relative to the shaft portion 36, whereby the end portions 56 are outwardly divergent along the axis of rotation of the blade assembly 50.

An elongated mounting brace 58 has one apertured end 60 thereof journaled on the output shaft 36 and the other end portion of the brace 58 is right angulated and secured to the longitudinal midportion 62 of a quarter cylindrical shield panel 64 by means of suitable fasteners 66. The shield panel 64 is disposed in position opening away from the upper end of the handle 12 and closely embraces the upper rear quadrant of the blade assembly 50. The lower arch end of the shield panel 64 is curved outwardly and upwardly as at 68 in order to define a broad curved ground engaging foot 70 for a purpose to be hereinafter more fully set forth and one end of a longitudinally slotted arcuate brace 72 is secured to the lower arch end of the shield panel 64 by means of fasteners 74, the radius of curvature of the curved slot 76 formed in the arcuate brace 72 being equal to the spacing between the center of the slot 76 and the rotary output shaft 36 whereby the slot 76 is concentric with the axis of rotation of the shaft 36.

A threaded shank 78 is supported from and projects outwardly of the flange portion 14 of the handle 12 and is received through the slot 76. A thumb nut 80 is threadedly engaged with the outer end of the shank 78 and thereby functions as a clamp nut which may be tightened in order to maintain the arcuate brace 72 in adjusted shifted position relative to the threaded shank 78 and handle 12. However, an expansion spring 82 is connected between the handle 12 as at 84 and the forward free end of the arcuate brace 72 as at 86 and functions to yieldingly bias the shield panel 64 in a clockwise direction as viewed in FIG. 2 of the drawings to the position thereof illustrted in FIG. 2 and yieldingly resists counterclockwise displacement of the shield panel 64 from the position thereof illustrated in FIG. 2 when the thumb nut 80 is loosened.

With attention now invited more specifically to FIGS. 1, 2 and 5 of the drawings, it may be seen that a U-shaped brace 88 has its bight portion 90 secured to the underside of the midportion of the flange portion 16 by means of a fastener 92 and that the legs 94 of the brace 88 depend downwardly from the handle 12 at right angles relative thereto and are provided with longitudinal slots 96. A journal bearing assembly 98 is pivotally supported between the legs 94 by means of combined pivot and clamp fasteners 100 secured through the slots 96 and threaded into opposite side portions of the journal bearing assembly 98. The central portion of the shaft 46 extends through and is journaled from the journal bearing assembly 98. Of course, it will be noted that the combined pivot and clamp fasteners 100 coact with the slotted legs 94 to provide a means for mounting the bearing assembly 98 for proper alignment of the chuck assembly 44 and the input shaft 34.

With attention now invited more specifically to FIGS. 3 and 5 of the drawings, it may be seen that one end of an elongated cutter blade 102 is secured to the underside of the right angle gear transmission 32 by means of a fastener 104 and that the other end 106 of the cutter blade 102 closely parallels the portion of the output shaft 36 extending between the housing of the right angled gear transmission 32 and the cutter blade assembly 50. The cutter blade 102 is designed to cut any vegetation tending to wind about the output shaft 36.

The edges of the angulated outer end portions 56 of the blade members 54 facing in the direction of rotation of the blade assembly 50 are toothed as at 108 and it is to be appreciated that the cutter blade assembly 50 is removably supported from the output shaft 36 in order that it may be removed and replaced by any suitable form of rotary edging blade (not shown), if desired.

In operation, the shield panel 64 may be adjusted to the position thereof illustrated in FIG. 2 and the thumb nut 80 may be tightened in order to retain the shield panel 64 in that adjusted position. Thereafter, the hand drill 38 may be clamped in the split clamp assembly 18 as the upper end of the shaft 46 is chucked in the chuck assembly 44. Thereafter, the hand drill 38 may be actuated in order to cause the cutter blade 50 to rotate in a counterclockwise direction as viewed in FIG. 2 of the drawings.

With the shield 64 in the position thereof illustrated in FIG. 2, the cutter blade assembly 50 may be utilized in the manner of a rotary tiller in order to cultivate the ground upon which the shoe 70 slides. Of course, the handle 12 will be disposed at substantially 45° relative to the horizontal and the depth of penetration of the end portions 56 of the blade assembly 50 will be controlled by sliding contact of the shoe 70 with the ground. Therefore, the depth of penetration of the end portion 56 of the blade assembly 50 may be controlled by adjustment of the shield panel 64. However, the shield panel 64 is yieldingly biased toward the position thereof illustrated in FIG. 2 by means of the expansion spring 82 and the thumb nut 80 may be loosened with the shoe 70 of the shield panel 64 still maintaining a substantially constant depth of penetration of the end portions 56 of the blade assembly 50. However, if deeper penetration of the end portions 56 is momentarily or occasionally desired, manual hand pressure may be exerted on the hand drill 38 and/or the handle 26 in a downward direction whereby the downward manual thrust on the hand drill and handle transferred to the shoe 70 will cause the shield panel 64 to be displaced in a counterclockwise direction relative to the handle 12 as viewed in FIG. 2 of the drawings and thus increase penetration of the end portions 56. Of course, when increased penetration of the end portions 56 of the blade assembly 50 is no longer desired, the downward manual thrust applied to the hand drill 38 and/or the handle 26 may be relieved in order that the expansion spring 82 may again pivot the shield panel 64 to the position thereof illustrated in FIG. 2. Further, by choosing expansion springs of different lengths, the positioning of the shield panel 64 relative to the handle 12 may be varied, as desired.

The journal bearing assembly 98 is mounted in a manner so that it may be properly aligned with the chuck 44 and input shaft 34 and the assembly 98 serves to journal the midportion of the shaft 46 to eliminate any tendency of the shaft 46 to "whip".

If it is desired to perform an edging operation as opposed to a tilling operation, the blade assembly 50 may be removed and replaced by any suitable form of rotary edging blade. Of course, the positioning of the shield panel 64 prior to an edging operation may also be adjusted as desired so as to provide the desired depth of cut of the edging operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated inclined support arm including forward lower and rear upper ends, a rotary shaft member journaled from the lower end of said support arm for rotation about a horizontal transverse axis, motor support means on the other upper end of said support arm for supporting motor means including a rotatable output shaft, said support arm including rotary torque transmitting means having a first portion drivingly connected to said rotary shaft member and a second portion adjacent said other upper end of said support arm adapted to be driven by the rotatable output shaft of motor means supported from said support means, a rotary blade structure mounted on one end of said rotary shaft member to one side of said one end of said support arm, an arcuate shield panel, support means supporting said panel in position partially embracingly encircling said rotary blade structure and opening toward the latter away from said other end portion of said support arm, the rear arch end portion of said shield panel including ground engaging means for supportive contact with the ground at a level above the lower periphery of said rotary blade structure, said support means including means mounting said arcuate shield panel for adjustable angular displacement about the axis of rotation of said shaft member, whereby the elevation of said ground engaging means relative to said lower periphery of said rotary blade structure may be varied.

2. The combination of claim 1 wherein said ground engaging means includes means defining a downwardly facing and convex partial cylindrical bearing surface on said rear arch end portion of said shield panel.

3. The combination of claim 1 wherein said means defining said bearing surface comprises an integral rearwardly and upwardly curved integral terminal end portion of said rear arch end portion.

4. The combination of claim 1 including a cutting blade portion closely paralleling said rotary shaft member between said rotary blade structure and said support arm.

5. The combination of claim 1 wherein motor support means comprises an adjustable clamp structure for removably clamping a motor to said support arm.

6. The combination of claim 1 wherein the upper end of said support arm includes a laterally and horizontally outwardly projecting handle.

7. The combination of claim 1 wherein said rotary torque transmitting means includes an elongated drive shaft generally paralleling said support arm.

8. The combination of claim 1 wherein motor support means comprises an adjustable clamp structure for removably clamping a motor to said support arm, and an electric motor including a rotatable output shaft removably supported from said clamp structure with its output shaft means generally paralleling said support arm and extending toward the lower end thereof, said rotary torque transmitting means including an elongated drive shaft generally paralling said support arm and to which said output shaft is drivingly coupled.

9. The combination of claim 8 wherein said rotary torque transmitting means further includes a right angle gear transmission including an input shaft to which the lower end of said drive shaft is removably coupled and an output shaft assembly including said rotary shaft member.

10. In combination, an elongated inclined support arm including forward lower and rear upper ends, a rotary shaft member journaled from the lower end of said support arm for rotation about a horizontal transverse axis, motor support means on the other upper end of said support arm for supporting motor means including a rotatable output shaft, said support arm including rotary torque transmitting means having a first portion drivingly connected to said rotary shaft member and a second portion adjacent said other upper end of said support arm adapted to be driven by the rotatable output shaft of motor means supported from said support means, a rotary blade structure mounted on one end of said rotary shaft member to one side of said one end of said support arm, an arcuate shield panel, support means supporting said panel in position partially embracingly encircling said rotary blade structure and opening toward the latter away from said other end portion of said support arm, the rear arch end portion of said shield panel including ground engaging means for supportive contact with the ground at a level above the lower periphery of said rotary blade structure, said motor support means comprising an adjustable clamp structure for removably clamping a motor to said support arm, and an electric motor including a rotatable output shaft removably supported from said clamp structure with its output shaft generally paralleling said support arm and extending toward the lower end thereof, said rotary torque transmitting means including an elongated drive shaft generally paralleling said support arm and to which said output shaft is drivingly coupled, said rotary torque transmitting means further including a right angle gear transmission including an input shaft to which the lower end of said drive shaft is removably coupled and an output shaft assembly including said rotary shaft member, journal bearing means, mounting means supporting said journal bearing means from a longitudinal midportion of said support arm, said journal means journalling a longitudinal midportion of said drive shaft, said mounting means including means supporting said journal bearing means from said support arm for shifting of said journal bearing means toward and away from said support arm.

11. The combination of claim 10, wherein said mounting means includes means enabling angular adjustment of said journal bearing means about an axis generally normal to a plane containing said support arm and drive shaft.

12. In combination, an elongated inclined support arm including forward lower and rear upper ends, a rotary shaft member journaled from the lower end of said support arm for rotation about a horizontal transverse axis, an elongated drive shaft generally paralleling said support arm on one side thereof, a rotary blade structure mounted on one end of said rotary shaft member, rotary torque transmitting means drivingly connecting the lower end of said drive shaft to said rotary shaft member and including a torque input member rotatable about an axis generally paralleling said support arm and to which the lower end of said drive shaft is connected, motor support means on the upper end of said support arm for supporting a motor from said arm including a rotatable output shaft generally paralleling and disposed on said one side of said support arm, journal bearing means, mounting means supporting said journal means from a longitudinal midportion of said support arm, said journal means journaling a longitudinal midportion of said drive shaft, said mounting means including means supporting said journal bearing means from said support arm for shifting of said journal bearing means toward and away from said support arm.

13. The combination of claim 12 wherein said mounting means includes means enabling angular displacement of said journal bearing means about an axis generally normal to a plane containing said support arm and drive shaft.

* * * * *